(12) United States Patent
Hannig et al.

(10) Patent No.: US 11,999,140 B2
(45) Date of Patent: Jun. 4, 2024

(54) DECORATIVE PANEL HAVING A MULTI-LAMINATE PLASTIC CARRIER PLATE AND METHOD FOR THE PRODUCTION THEREOF

(71) Applicant: AKZENTA PANEELE + PROFILE GMBH, Kaisersesch (DE)

(72) Inventors: Hans-Jürgen Hannig, Bergisch Gladbach (DE); Felix Hüllenkremer, Koblenz (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 0 days.

(21) Appl. No.: 17/992,200

(22) Filed: Nov. 22, 2022

(65) Prior Publication Data

US 2023/0103484 A1   Apr. 6, 2023

Related U.S. Application Data

(63) Continuation of application No. 16/649,299, filed as application No. PCT/EP2019/071765 on Aug. 13, 2019, now Pat. No. 11,518,148.

(30) Foreign Application Priority Data

Aug. 14, 2018   (EP) .................................... 18188985

(51) Int. Cl.
*B32B 27/08* (2006.01)
*B32B 27/20* (2006.01)
(Continued)

(52) U.S. Cl.
CPC .............. *B32B 27/08* (2013.01); *B32B 27/20* (2013.01); *B32B 27/36* (2013.01); *B32B 37/02* (2013.01);
(Continued)

(58) Field of Classification Search
None
See application file for complete search history.

(56) References Cited

U.S. PATENT DOCUMENTS 6,888,147 B1   5/2005   Hansson et al.
11,518,148 B2 *  12/2022   Hannig .................. B32B 37/02
(Continued)

FOREIGN PATENT DOCUMENTS

CN     103391845 A     11/2013
CN     104918994 A     9/2015
(Continued)

OTHER PUBLICATIONS

Office Action regarding Russian Patent Application No. 2020123234 (English translation not provided), dated Jan. 13, 2021.
(Continued)

*Primary Examiner* — Laura C Powers
(74) *Attorney, Agent, or Firm* — Harness, Dickey & Pierce, P.L.C.

(57) ABSTRACT

The present disclosure relates to a decorative panel with a carrier plate comprising a multi-laminate plastic carrier material with a plurality N of layer sequences of the A-B-A type, wherein layer A comprises a first thermoplastic resin and layer B a second thermoplastic resin different from the thermoplastic resin of layer A and wherein N lies between $\geq 3$ and $\leq 250$.

6 Claims, 2 Drawing Sheets

(51) Int. Cl.
*B32B 27/36* (2006.01)
*B32B 37/02* (2006.01)
*B32B 38/00* (2006.01)
*E04F 13/08* (2006.01)
*E04F 15/10* (2006.01)

(52) U.S. Cl.
CPC ........ *B32B 38/145* (2013.01); *E04F 13/0866* (2013.01); *E04F 15/105* (2013.01); *E04F 15/107* (2013.01); *B32B 2250/05* (2013.01); *B32B 2250/24* (2013.01); *B32B 2250/40* (2013.01); *B32B 2307/554* (2013.01); *B32B 2307/584* (2013.01); *B32B 2419/00* (2013.01); *B32B 2451/00* (2013.01); *B32B 2471/00* (2013.01); *B32B 2607/00* (2013.01)

(56) References Cited

U.S. PATENT DOCUMENTS

| | | |
|---|---|---|
| 2002/0187314 A1 | 12/2002 | Shibata |
| 2015/0151486 A1 | 6/2015 | Dahl et al. |
| 2015/0251486 A1 | 9/2015 | Hannig |
| 2016/0237696 A1 | 8/2016 | Frommherz et al. |
| 2017/0058537 A1 | 3/2017 | Lombaert et al. |
| 2017/0106629 A1* | 4/2017 | Hayashi ............ B32B 17/10743 |

FOREIGN PATENT DOCUMENTS

| | | |
|---|---|---|
| EP | 2722189 A1 | 4/2014 |
| EP | 3037276 A1 | 6/2016 |
| EP | 3837110 B1 | 6/2022 |
| KR | 20130078581 A | 7/2013 |
| KR | 10-2015-0021150 A | 3/2015 |
| WO | WO-2016052674 A1 | 4/2016 |

OTHER PUBLICATIONS

Office Action regarding Canadian Patent Application No. 3,084,655, dated Jun. 18, 2021.
Office Action regarding Chinese Patent Application No. 201980005540.X, dated Jul. 1, 2021.
Korean Office Action regarding Application No. 10-2020-7026381, mailed May 12, 2022.
Mexican Office Action regarding Patent Application No. MXA2020007397, dated Aug. 18, 2022.

* cited by examiner

DECORATIVE PANEL HAVING A MULTI-LAMINATE PLASTIC CARRIER PLATE AND METHOD FOR THE PRODUCTION THEREOF

CROSS-REFERENCE TO RELATED APPLICATIONS

This is a continuation application of Ser. No. 16/649,299 filed Mar. 20, 2020, which is a National Phase of International Application No. PCT/EP2019/071765 filed on Aug. 13, 2019. This application claims the benefit of European Patent Application No. 18188985.8, filed on Aug. 14, 2018. The entire disclosures of the above applications are incorporated herein by reference.

FIELD

The present disclosure relates to a decorative panel with a multi-laminate plastic carrier plate and a method for its production.

BACKGROUND

This section provides background information related to the present disclosure which is not necessarily prior art.

Decorated panels are known per se, wherein the term wall panel is also to be understood to mean panels which are suitable for ceiling or door cladding. They usually comprise a carrier or core made of a solid material, for example a wood-based material, such as for example a medium-density fibreboard (MDF) or a high-density fibreboard (HDF, a wood-plastic composite material (WPC) or a mineral-plastic composite material (MPC), which is provided on at least one side with a decorative layer and a cover layer and, optionally, with further layers, for example a wear layer arranged between the decorative and cover layer. In the case of MDF or HDF carriers, the decorative layer is the usually applied on a print material arranged on the carrier, which for example can be formed by a paper layer. It is known to print the decorative layer on the paper layer even before the application of the paper layer on the carrier or also to apply an initially unprinted paper layer on the carrier and then to apply the decorative layer on the paper layer by means of so-called direct printing processes. In the case of carriers based on plastic-composite materials, it is known to provide the latter with a decoration in the direct printing process, optionally after application of the print material.

A drawback with carriers based on wood materials is often the only limited moisture resistance of the resultant decorative panels, as a result of which the area of application of these panels is limited. In recent years, therefore, plastic-based carriers have increasingly been developed in order to extend the area of application of corresponding decorative panels. Precisely in the area of plastic-based carriers, however, there is still potential for development with a view to improving the latter from the ecological and economic standpoint.

SUMMARY

This section provides a general summary of the disclosure, and is not a comprehensive disclosure of its full scope or all of its features.

It is the problem of the present disclosure to propose an improved decorative panel.

Preferred embodiments of the disclosure are indicated in the sub-claims, in the description and the figures, wherein further features described or shown in the sub-claims or the description or the figures can represent a subject-matter of the disclosure individually or in any combination, unless the opposite is explicitly indicated by the context. In particular, the undermentioned quantity data and properties of the respective materials or substances can be combined arbitrarily with one another.

A decorative panel, comprising a carrier plate, a decoration arranged on the carrier plate, a wear protection layer arranged above the decoration, and optionally corresponding locking means on at least two side edges of the panel, is proposed with the disclosure, which is characterised in that the carrier plate comprises a multi-laminate layer structure with a plurality N of layer sequences of the A-B-A type, wherein layer A comprises a first thermoplastic resin and layer B a second thermoplastic resin different from the thermoplastic resin of layer A and wherein N lies between $\geq 3$ and $\leq 50$.

Surprisingly, it has been able to be shown that such a plastic carrier material enables the production of a wall, ceiling or floor panel with an improved moisture resistance, in particular with reduced swelling due to moisture or heat and with good mechanical properties and improved processability. Moreover, the plastic carrier material according to the disclosure is ecologically advantageous, since it can be produced in large measure from recycled plastic and therefore saves resources.

The term "decorative wall or floor panel" or "decorative panel" is understood to mean, in the sense of the disclosure, in particular wall, ceiling, door or floor panels, which comprise a decoration replicating a decorative pattern applied on a carrier plate. Decorative panels are used in diverse ways both in the area of the interior finishing of rooms, and also for the decorative cladding of buildings, for example in fair construction. One of the most frequent areas of application of decorative panels is their use as floor coverings. In many cases, decorative panels have a decoration which is intended to replicate a natural material.

Examples of such replicated natural materials or decorative patterns are types of wood such as for example maple, oak, birch, cherry, ash, walnut, chestnut, Wenge or also exotic woods such as Panga-Panga, mahogany, bamboo and Bubinga. Moreover, natural materials such as stone surfaces or ceramic surfaces are replicated.

Accordingly, a "decorative pattern" can in particular be understood, in the sense of the present disclosure, to mean such an original natural material or at least a surface of one such, which is to be imitated or replicated by the decoration.

A "free-flowing" material can be understood in particular to mean a material which can be applied on a substrate by means of a pouring process or scattering process. The material can be present as a fluid or in particular as a free-flowing solid.

Furthermore, a "granulate" or a "granular material" can be understood to mean a solid or an aggregate of solid material, which comprises a multiplicity of solid particles, such as for example grains or spheres, or consists thereof. By way of example, but not exhaustively, mention may also be made here of grainy or powdery materials.

A "carrier" can be understood in particular to mean a layer serving as a core or base layer in a finished panel, which can in particular comprise a natural material, such as for example a wood material, a fibre material or a material comprising a plastic. For example, the carrier can endow the panel with a suitable stability or contribute thereto.

Accordingly, a carrier material can also be understood to mean a material which at least for the most part forms the carrier. In particular, the carrier can be made of the carrier material.

A "web-like carrier" can be understood to mean a carrier which, for example in its production process, is web-like and thus has a much greater length compared to its thickness and width and its length can amount for example to more than 15 metres.

A "plate-shaped carrier" can also be understood, in the sense of the present disclosure, to mean a carrier which is formed by separation from the web-like carrier and is constituted in the shape of a plate. Furthermore, the plate-shaped carrier can already define the shape and/or size of the panel to be produced. However, the plate-shaped carrier can also be provided as a large plate. A large plate, in the sense of the disclosure, is in particular a carrier, the dimensions of which exceed the dimensions of the final decorative panels by a multiple and which are split up during the production process into a corresponding plurality of decorative panels, for example by sawing, laser or water-jet cutting. For example, the large plate can correspond to the web-shaped carrier.

A carrier material as described above thus serves in particular for the production of a carrier for a decorative wall or floor panel. The carrier material essentially comprises two materials, wherein a material in the sense of the present disclosure can be understood to mean both a homogeneous material, i.e. a material formed from only one substance, as well as a heterogeneous material, i.e. a material comprising at least two substances, wherein the material comprising at least two substances can thus also be understood as a substance mixture.

According to an embodiment of the disclosure, layers A and B each have a layer thickness between 100 µm and 2000 µm. Provision can be made such that the layer thickness of layer A is different from the layer thickness of layer B. Thus, provision can for example be made such that layer B has a layer thickness which corresponds to ≥100% to ≤1000% of the thickness of layer A. In a further embodiment, provision can be made such that layer A has a layer thickness which corresponds to ≥100% to ≤1000% of the thickness of layer B. In a further embodiment of the disclosure, provision can be made such that the layer thickness of the two layers A are different from one another.

According to an embodiment of the disclosure, the thermoplastic resin of layer B can comprise an amorphous thermoplastic resin. This amorphous thermoplastic resin can preferably be a polyethylene terephthalate (PET).

According to a further embodiment of the disclosure, provision can be made such that the thermoplastic resin of layer B comprises a recycled amorphous polyethylene terephthalate (PET). Polyethylene terephthalate (PET) occurs in large quantities in the packaging industry, where it is used in particular for food packaging and drinks bottles. Since the highest standards have to be complied with especially in the area of food packaging, recycling of PET can usually only be carried out to a limited extent. Even despite the recycling methods that have now become available, such as for example the URRC method (United Resource Recovery Corporation), large quantities of PET are not recycled in the close vicinity, but rather are exported for the production of plastic fibres. The method according to the disclosure offers a further possible use here for recycled PET.

The proportion of recycled polyethylene terephthalate in layer B can preferably lie in a range between ≥10 wt.-% and ≤100 wt.-% related to the polymer proportion of layer B. Particularly preferably, the proportion of recycled polyethylene terephthalate in layer B can lie in a range between ≥15 wt.-% and ≤90 wt.-%, ≥20 wt.-% and ≤80 wt.-% in particular related to the polymer proportion of layer B.

Apart from the amorphous thermoplastic resin, a partially crystalline thermoplastic resin, such as for example a virginal polyethylene terephthalate, can be provided in layer B. The proportion of partially crystalline thermoplastic resin can lie in a range between ≥0 wt.-% and ≤90 wt.-% related to the polymer proportion of layer B. Particularly preferably, the proportion of partially crystalline thermoplastic resin in layer B can lie in a range between ≥10 wt.-% and ≤80 wt.-%, ≥15 wt.-% and ≤75 wt.-% in particular, related to the polymer proportion of layer B. By providing partially crystalline thermoplastic resin, such as for example virginal PET, in layer B, improved binding with layers A can be achieved.

According to a further embodiment of the disclosure, provision can be made such that layer B comprises a filler material apart from the thermoplastic resin, wherein the filler material is preferably selected from the group comprising chalk, non-asbestos silicate, preferably magnesium silicate, wood dust, expanded clay, volcanic ash, pumice, cellular concrete, in particular inorganic foams, cellulose or a blowing agent.

The proportion of filler can preferably lie in a range between ≥1 wt.-% and ≤60 wt.-%, in particular in a range between ≥5 wt.-% and ≤50 wt.-% related to the total mass of material forming layer B.

Advantageously, it is possible by means of the addition of fillers to adjust the material properties of the multi-laminate plastic carrier material, such as for example its specific weight, or also its calorific value. The latter is relevant especially for the question of wall, ceiling or floor covering formed on the basis of a corresponding multi-laminate plastic carrier and the fire load introduced by such covering into a building. Generally, the proportions of thermoplastic resin material or filler material can be selected depending on the desired area of application and the desired properties of a panel formed on the basis of a multi-laminate plastic carrier material according to the disclosure. Good adaptability to the desired area of application can thus be made possible.

Particularly preferably, provision can be made such that a layered silicate, such as talcum for example, is provided as a filler in layer B. Talcum is understood to mean a magnesium silicate hydrate known in a manner per se which can for example comprise the total chemical formula $Mg_3[Si_4O_{10}(OH)_2]$. The filler content is thus advantageously formed at least by a large proportion of the mineral substance talcum, wherein this substance can be used for example in powder form or can be present in the carrier material in the form of particles. In principle, the solid material can comprise a powdery solid.

It may be advantageous if the specific surface density according to BET, ISO 4652 of the talcum particles lies in a range from von ≥4 $m^2/g$ to ≤8 $m^2/g$, for example in a range from ≥5 $m^2/g$ to ≤7 $m^2/g$.

Furthermore, it may be advantageous if the talcum is present with a bulk density according to DIN 53468 in a range from ≥0.15 $g/cm^3$ to ≤0.45 $g/cm^3$, for example in a range from ≥0.25 $g/cm^3$ to ≤0.35 $g/cm^3$.

With regard to the material forming layer B, provision can also be made such that the thermoplastic resin material and the filler together, related to the material forming layer B as a whole, are present in a quantity of ≥95 wt.-%, in particular ≥99 wt.-%. In other words, provision can be made such that, apart from the thermoplastic resin material and the filler in the material forming layer B, further substances are present only in a proportion, related to the material forming layer B, of <5 wt.-%, preferably of <1 wt.-%. Thus, it may be advantageous for the material forming layer B to comprise in large measure thermoplastic resin and one or more fillers.

Moreover, provision can be made such that thermoplastic resin material of layer B comprises further components such as for example flexibilisers, pigments, stabilisers, impact strength modifiers, surface-active agent additives and/or dispersion additives.

Insofar as pigments are provided as further components, it is advantageous if the colour pigments do not contain any lead and/or cadmium. Colour pigments used can for example comprise copper-phthalocyanine, quinacridone and/or diketopyrrolopyrrole. The effect of this is that the carrier material can be recycled in an environmentally friendly way.

According to an embodiment of the disclosure, the amorphous thermoplastic resin in layer B can be formed by a recycled PET and the partially crystalline thermoplastic resin in layer B by a virginal PET.

According to an embodiment of the disclosure, the recycled PET (rPET) can have a Vicat softening point between ≥70° C. and ≤80° C., for example at 75° C.

Furthermore, provision can be made such that the recycled PET (rPET) has a Melting Flow Index (MFI) between ≥40 g/10 min and ≥60 g/10 min, such as for example 49 g/10 min.

Furthermore, provision can be made such that the heat distortion resistance (method A: 1.82 MPa) of the rPET lies in a range from ≥63° C. and ≤83° C., such as for example at 73° C.

According to an embodiment of the disclosure, the rPET can have a tensile strength between ≥50 MPa and ≤70 MPa, such as for example 60 MPa.

According to an embodiment of the disclosure, the rPET can have a tensile modulus in a range from ≥1500 MPa to ≤≥500 MPa, such as for example of 2000 MPa.

According to an embodiment of the disclosure, the elongation at tear of the rPET can lie in a range between ≥7.0% and ≤12.0%, such as for example at 9.2%.

According to an embodiment of the disclosure, the rPET can achieve a Charpy impact strength in a range between ≥20 kJ/m$^2$ and ≤40 KJ/m$^2$, such as for example of 30 KJ/m$^2$.

According to a further embodiment of the disclosure, the material of layer B, insofar as it comprises a mixture of recyclable PET and talcum, can have a Vicat softening point in a range between ≥70° C. and ≤90° C., for example at 83° C. According to a further embodiment, the heat distortion resistance (A-1.82 MPa) of such a material can lie in a range between ≥70° C. and ≤90° C., such as for example at 80° C. According to a further embodiment, the tensile strength of such a material can lie in a range between ≥35 MPa and ≤55 MPa, such as for example at 45 MPa. According to a further embodiment, the tensile modulus of such a material can lie in a range between ≤1800 MPa and ≤≥500 MPa, such as for example ≥100 MPa. According to a further embodiment, the elongation at tear of such a material can lie in a range between ≥2% and ≤10% and can amount for example to 4%. According to another embodiment, the Charpy impact strength of such a material can lie in a range between ≥5 KJ/m$^2$ and ≤20 KJ/m$^2$, for example at 10 KJ/m$^2$.

According to the disclosure, moreover, provision can be made such that different A-B-A film layers are arranged upon one another, which whilst being identical in the type of thermoplastic resin of type A, differ for example in the embodiment of layer B. Provision can thus be made, for example, such that inside the film stack a central film of type A-B-A is provided, in which layer B has a high content of filler, such as for example 50 wt.-% related to the total mass of layer B, whereas the A-B-A film layers arranged above and/or below this A-B-A film layer have a smaller filler content in layer B, such as for example 15 wt.-% related to the total mass of layer B.

Provision can also be made such that the A-B-A film layers stacked upon one another differ in the nature of their filler. Provision can thus be made for example such that one A-B-A film layer comprises a filler such as for example talcum and another A-B-A film layer comprises inorganic foams, cellulose and/or an blowing agent as a filler and the layers of type B thus differ in their physicochemical properties such as for example density, thermal capacity or hardness.

By providing different embodiments of the B layers, the overall property of the multi-laminate plastic carrier material according to the disclosure can be adjusted in broad ranges and adapted to the desired property of a product produced from this carrier material, such as for example a decorative panel.

According to a further embodiment of the disclosure, provision can be made such that the thermoplastic resin of layer A comprises a glycol-modified polyethylene terephthalate (PET-G). Surprisingly, it has been shown that the glycol-modified PET can act as a sealing or adhesive layer between the A-B-A layer composites and thus contribute decisively towards secure binding of the layer composites to one another.

According to an embodiment of the disclosure, the PET-G can have a Vicat softening point in a range between ≥63° C. and ≤83° C., such as for example 73° C. According to an embodiment of the disclosure, the heat distortion resistance (A-1.82 MPa) can have a value in a range between ≥59° C. and ≤79° C., such as for example 69° C. According to a further embodiment of the disclosure, the value of the tensile strength of the PET-G can lie in a range between ≥40 MPa and ≤60 MPa, such as for example at 50 MPa. Provision can be made such that the tensile modulus lies in a range between ≥1800 MPa and ≤2300 MPa, such as for example 2010 MPa. According to a further embodiment of the disclosure, provision can be made such that the elongation at tear of the PET-G lies in a range between ≥100% and ≤150%, such as for example at 130%. According to a further embodiment, the Charpy impact strength of a PET-G can lie in a range between ≥150 KJ/m$^2$ and ≤≥50 KJ/m$^2$, for example at 190 KJ/m$^2$.

According to a preferred embodiment of the disclosure, the proportion of glycol-modified polyethylene terephthalate lies in a range between ≥2 wt.-% und ≤10 wt.-% related to the thermoplastic resin of layer A.

Moreover, provision can be made such that the thermoplastic resin material of layer A comprises further components such as for example flexibilisers, pigments, stabilisers, impact strength modifiers, surface-active agent additives and/or dispersion additives.

According to the disclosure, provision can be made such that the layer thickness of layer B amounts to between ≥100% and ≤3000% of the layer thickness of layer A. In other words, layer B can have the same layer thickness as a layer A or can be up to 30 times the thickness of the latter. In particular, provision can be made such that the predominant part of the total layer thickness of the layer composite A-B-A is provided by layer B. Thus, provision can be made for example such that the layer thickness of layer B provides ≥50% of the total layer thickness of layer composite A-B-A, preferably ≥60%, in particular ≥70% and more preferably ≥90% of the total layer thickness.

Surprisingly, it has been shown that the provision of already thin layers A is suitable for connecting layer composites A-B-A to one another in such a way that a mechanically extremely stable multi-laminate plastic carrier material can be provided, the macroscopic properties of which are essentially characterised by the properties of layer B.

According to an embodiment of the disclosure, a layer composite A-B-A has a Vicat softening point in a range between ≥63° C. and ≤83° C., such as for example 73° C.

According to an embodiment of the disclosure, the melt of a layer composite A-B-A can have a melt flux index MFI in a range of ≥130 g/10 min and ≤190 g/10 min, such as for example 160 g/10 min.

According to an embodiment of the disclosure, the heat distortion resistance (A-1.82 MPa) of a layer composite can lie in a range between ≥55° C. and ≤85° C., such as for example 70° C.

According to a further embodiment of the disclosure, a layer composite A-B-A can have a tensile strength in a range between ≥63 MPa and ≤83 MPa, such as for example 73 MPa. According to an embodiment of the disclosure, the tensile modulus of a layer composite A-B-A can lie in a range between ≥3200 MPa and ≤3900 MPa, such as for example at 3680 MPa.

According to an embodiment of the disclosure, a layer compound A-B-A can have an elongation at tear in a range between 2.5% and 3.5%, such as for example 3.1%.

According to a preferred embodiment of the disclosure, the decorative panel according to the disclosure has a shrinkage at 80° C. according to ISO 23999 of ≤0.25%. The effect of this is advantageously that a floor, ceiling or wall covering formed from decorative panels according to the disclosure can be laid in a dimensionally stable manner and any crack or split formations particularly in the edge region of the laid areas can also be avoided in the case of a floating installation.

According to a further embodiment of the disclosure, the decorative panel has a total thickness of approx. 2.5 mm, in particular 2.5 mm. In the case of such a decorative panel, the number of A-B-A layer composites can be N=3. Such a decorative panel can preferably be used for a full-area glued installation.

According to a further embodiment of the disclosure, the decorative panel has a total thickness of approx. 3.2 mm, in particular 3.2 mm. In the case of such a decorative panel, the number of the A-B-A layer composites can be N=4. Such a decorative panel can preferably comprise complementary locking means at least ≥2 opposite panel edges, in particular at all opposite panel edges, by means of which two panels adjacent to one another can be joined together to form a mechanically connected covering.

Moreover, the disclosure relates to a method for the production of a decorative panel with a multi-laminate plastic carrier plate comprising the steps:
  a) production of a first film-like layer composite with layer sequence A-B-A, wherein layer A comprises a first thermoplastic resin and layer B comprises a second thermoplastic resin;
  b) laying a plurality N of first film-like layer composites with layer sequence A-B-A upon one another to form a layer stack, wherein ≥50≥N≥2, preferably 200≥N≥3, preferably 125≥N≥4, still more preferably 100≥N≥5;
  c) compressing of the layer stack under the effect of pressure and temperature; and
  d) cooling of the compressed layer stack to provide a carrier plate (100);
  e) application of a decorative layer (200) on the carrier plate (100) obtained in step d);
  f) application of a wear protection layer (300) on the decorative layer (200).

Surprisingly, it has been shown that a decorative panel according to the disclosure with a carrier plate comprising a multi-laminate plastic carrier material can be produced in a straightforward manner by means of the method according to the disclosure, in that a film with layer sequence A-B-A is produced by first feeding the first and second thermoplastic resins into a feed block and extracting the thermoplastic resins via a broad-slot die. The film thus obtained can then be stacked, wherein layers of type A lie opposite one another in each case. The film stack thus obtained can then be connected to a corresponding multi-laminate carrier material under the effect of pressure and temperature, wherein the layers of type A ensure the firmly bonded connection between the individual A-B-A film layers.

It is particularly advantageous that the target layer thickness of the multi-laminate plastic carrier material can easily be adjusted by the number of stacked A-B-A film layers connected to one another.

It is also possible to arrange different A-B-A film layers upon one another, which are identical in the nature of the thermoplastic resin of type A, but which are different for example in the embodiment of layer B.

According to an embodiment of the disclosure, provision can in particular be made such that the first thermoplastic resin of the film-like layer composite with layer sequence A-B-A is a virginal plastic and the second plastic is a recycled plastic.

Provision is made such that the process for producing the multi-laminate plastic carrier material according to the disclosure is split up into two stages. In the first, the A-B-A triple layer film is produced by coextrusion by means of a feed block and a broad-slot die. In the second step, the lamination of a plurality of films to form a plate takes place under the effect of pressure and temperature, for example by means of a double-band press.

The coextrusion process can be used to produce the triple layer film with layer sequence A-B-A. For example, two co-rotating twin-screw extruders can be used. The main extruder can be used for the material production of middle layer B and provision can be made such that the latter comprises two lateral feeds. These lateral feeds can be used in the mixing-in of fillers.

The second twin-screw extruder can be used to produce the thermoplastic resin for the two layers of type A. The latter can also comprise lateral feeds in order to enable mixing-in of further components.

In order to be able to remove any moisture and/or monomers that may be present from the polyester melt in the extruder, provision can be made such that a high-vacuum ventilation system is installed in both twin-screw extruders.

The polymer melts from both extruders can be conveyed, separately from one another, into a feed block. Whereas the melt from the main extruder forms the middle layer of type B, the material from the coextruder is conveyed above and below the middle layer and forms the outer layers of type A. The triple-layer melt can then be conveyed through a broad-slot die. By means of the latter, a uniform layer distribution over the entire desired film width is achieved.

Various variants can be used for the subsequent cooling process. The cooling of the melt can take place for example by means of a calendar roller system (calendar). A cooling roller can also be used. An air knife and a vacuum chamber can be used to ensure that the melt lies uniformly against the cooling roller. Such a process is known for example from the production of cast films.

According to a further embodiment of the disclosure, provision can be made such that at least a part of the film-like layer composites with layer sequence A-B-A is stretched biaxially before they are laid upon one another to form the layer stack. Biaxial stretching in the sense of the disclosure is understood to mean that the obtained film-like layer composites with layer sequence A-B-A are stretched in two directions orientated essentially orthogonal to one another, i.e. are stretched longitudinally and transversely. The desired film thickness (thickness) can thus be achieved and the weight per unit area reduced, and the mechanical properties, for example strength properties, can be improved, transparency increased, cold resistance improved and gas permeability of the film layer reduced. As a result of the biaxial stretching of the films with layer sequence A-B-A, their tensile strength in particular is increased, which has a direct effect on the mechanical properties of the finally produced multi-laminate plastic carrier material.

The biaxial stretching can take place either sequentially firstly in a first direction and then in a second direction, or simultaneously in both directions at the same time, simultaneous stretching being preferred.

Before stacking of the film-like layer composites with layer sequence A-B-A to form a film stack to be compressed, provision can be made according to the disclosure such that the film undergoes a two-sided corona treatment. It has been shown that the provision of a corona treatment contributes to an improved layer composite in the final multi-laminate plastic carrier material. The corona treatment can take place directly after the film production and before winding of the film onto a sleeve, or directly before the stacking of the films to form a corresponding film stack before the latter is compressed.

To this extent, the film-like layer composite with layer sequence A-B-A is a semi-finished product, which can be placed in temporary storage. Storage can take place preferably at room temperature and with an air humidity of 50%. The film-like layer composite can be stored for an arbitrary length of time under these conditions.

Provision can also be made such that the film-like layer composite with film sequence A-B-A is stacked immediately after its production to form a layer stack to be compressed and the production process is designed as an in-line production process.

The triple-layer film-like layer composites with layer sequence A-B-A can be stacked or laminated lying upon one another via film layers of type A located on the outer side in a preferably isolatable double-band press under the effect of pressure and temperature to form a continuous plate material.

The press used can for example have a forward feed rate of 20 m/min.

The triple-layer film-like layer composites with sequence A-B-A can be clamped on unwinding units in a station, according to the required plate thickness and layer arrangement. Preheating of the triple-layer film-like layer composites with layer sequence A-B-A to for example ≥80 to ≤135° C. can be used for the pressing process. Suitable heat sources for this can for example be a heated roller, hot air, an IR radiator, in particular an NIR radiator or a microwave radiator or a combination of the latter.

Compressing of the film stack subsequently takes place preferably in a double-band press. The double-band press can preferably be equipped with steel straps.

The pressing time can lie in a range from ≥0.5 min to ≤20 min, preferably in a range from ≥1 min to ≤50 min, in particular ≤2 min.

According to the disclosure, the pressure to be provided during the compression can lie in a range from ≥0.5 MPa to ≤≥5 MPa, preferably in a range from ≥1 MPa to ≤15 MPa.

The target temperature in the core of the film stack can preferably be adjusted in a range between ≥65° C. and ≤140° C., in particular in a range between ≥80° C. and ≤120° C. This provides for good binding between the individual films.

The finished carrier plate or the finished multi-laminate plastic carrier material can then be cooled preferably uniformly to room temperature. This takes place for example with the aid of an air-cooled roller in the double-band press. Cutting to size and stacking then takes place.

According to the disclosure, it can be expressly provided such that the process according to step d) and/or e) is interrupted and the product obtained in steps d) and/or e) is temporarily stored as a semi-finished product before the process is continued.

According to a further embodiment of the disclosure, provision can be made such that the film-like layer composites with layer sequence A-B-A are laid orthogonal to one another during the stacking to form a layer stack. Orthogonal laying is to be understood in the sense of the disclosure to mean that the films, with regard to their production direction, i.e. the length direction, are stacked transversely to one another. A further improvement in the mechanical properties of the final multi-laminate plastic carrier material can thus be achieved. Any production-related longitudinal stresses that may occur within the individual film-like layers with layer sequence A-B-A due to the broad-slot die or the calendar are compensated for by the final arrangement and lead to an anisotropic material.

Provision can be made such that the compressing of the film stack takes place in a batch process, wherein the films are orientated orthogonal to one another and laminated to one another in a press, such as for example a multi-platen press. It is understandable that the film-like layer composites with layer sequence A-B-A have to be cut to a specific size for this in advance.

The pressing time can lie in a range from ≥0.5 min to ≤20 min, preferably in a range from ≥1 min to ≤50 min, in particular ≤2 min.

According to the disclosure, the pressure to be provided during compressing lies in a range from ≥0.5 MPas to ≤≥5 MPas, preferably in a range from ≥1 MPas to ≤15 MPas.

The target temperature in the core of the film stack can preferably be adjusted in a range between ≥65° C. and ≤140° C., in particular in a range between ≥80° C. and ≤120° C. This provides for good binding between the individual films.

The finished plate or the finished multi-laminate plastic carrier material can then be cooled preferably uniformly to room temperature. This takes place for example with the aid of an air-cooled roller in the double-band press. Optional further cutting to size and stacking can then take place.

Furthermore, the edge regions of the panel can be structured or profiled in order to provide in particular detachable connecting elements. In this regard, provision can be made in the case of profiling in the sense of the disclosure such that a decorative and/or functional profile is introduced at least into a part of the edges of the decorative panel by means of suitable material-removing tools. A functional profile is to be understood to mean for example the introduction of a tongue and/or groove profile into an edge, in order to design the decorative panels capable of being connected to one another by means of the introduced profiling. Especially in the case of tongue and/or groove profiles, elastic materials are advantageous, because by means of the latter alone profiles can be produced which are particularly easy to handle and are stable. In particular, no further materials are thus required to produce the connecting elements. The multi-laminate plastic carrier material can enable the provision of panels which have a connection strength according to ISO 24334 for a joint opening of 0.2 mm of ≥2.0 kN/m, preferably of ≥4.0 kN/m, in the longitudinal direction and of ≥2.5 kN/m, preferably of ≥4.5 kN/m, in the transverse direction.

According to a further embodiment of the disclosure, provision can be made such that the multi-laminate plastic carrier material undergoes a tempering step or heat treatment step following the compression step. The effect of this is advantageously that the shrinkage of the multi-laminate plastic carrier material is greatly reduced. In particular, the effect of this can be that the shrinkage of the multi-laminate plastic material is reduced to a value of ≤0.25% at 80° C. for 6 h according to ISO 23999. A tempering process in the sense of the disclosure is to be understood to mean that the compressed multi-laminate plastic carrier material is cooled to a temperature ≤45° C., preferably ≤40° C., in particular ≤35° C. and is then heated to a temperature above the glass transition temperature TG of the plastic of the plastic carrier material. The multi-laminate plastic carrier material is preferably heated to a temperature in a range between ≥90° C. and ≤110° C. According to an embodiment of the disclosure, the multi-laminate plastic carrier material is heated for a period of 0.5 to 5 minutes, preferably 1 to 4 minutes, in particular 1.5 to 3 minutes to a temperature above the glass transition temperature of the plastic, in particular to a temperature in a range between ≥90° C. and ≤110° C.

The heating in the context of the tempering process described above can take place for example by means of IR radiators, in particular by means of NIR radiators (near-infrared radiators), microwave radiation, wherein provision can in particular be made such that radiation takes place with suitable radiators from the upper side and the lower side of the multi-laminate plastic carrier material, preferably simultaneously.

The intended tempering step can take place at any point downstream of the compression of the film stack in step c).

For the final production of a decorative panel using a multi-laminate plastic carrier material according to the present disclosure, provision is made such that a decorative undercoat is optionally applied on at least a partial region or the entire area of the carrier;

Furthermore, a method according to the disclosure can comprise the additional steps:

h) structuring of the protective layer, and
i) treatment of the carrier for electrostatic discharge and optionally for electrostatic charging before at least one of the aforementioned process steps.

Surprisingly, it has been able to be shown that it can be made possible by the method described above to enable a particularly advantageous production especially of a carrier of a wall or floor panel. The method can be particularly advantageous by using the carrier material as is described in detail above.

According to the disclosure, provision can be made such that the decorative layer is applied on the carrier in step e) by means of a direct print process or is fixed on the carrier as a pre-produced decorative layer.

For the production of a finished panel, the method can comprise further process steps for providing the carrier with a decoration and coating the latter with a protective layer. The following steps are preferably carried out immediately with the produced web-shaped carrier or core. It is however also included in the disclosure that the web-shaped carrier or core is first split up, before a suitable one of process steps e) and/or f), into a multiplicity of plate-shaped carriers and/or the plate-shaped carrier is further treated by the correspondingly following process steps. The following explanations apply accordingly to both alternatives.

A pre-treatment of the carrier for electrostatic discharge and optionally subsequent electrostatic charge can also take place in the first place, for example, before process step e). This can in particular serve to prevent the occurrence of blurring in the course of the application of the decoration.

According to an embodiment of the disclosure, provision can be made such that, before process step e), a decorative undercoat is applied on at least a partial region of the carrier. For example, a primer can first be applied as a decorative undercoat and especially for printing processes, for example in a thickness of ≥10 μm to ≤60 μm. As a primer, use can be made of a liquid radiation-curing mixture based on a urethane or a urethane acrylate, optionally with one or more of a photoinitiator, a reactive thinner, a UV-stabiliser, a rheology agent as a thickener, radical catchers, flow control agents, defoaming agents or preservation agents, pigment and/or a dye.

Apart from the use of a primer, it is possible to apply the decoration on a decor paper which can be printed with a suitable decoration and which can be provided as a joining agent for example by means of a resin layer previously applied on the carrier. Such a print material is suitable both for flexo printing, offset printing or silk screen printing processes, and also in particular for digital printing techniques, such as for example inkjet processes or laser printing processes. For the application of the resin layer, provision can preferably be made such that a resin composition is applied, which comprises as a resin component at least one compound selected from the group comprising melamine resin, formaldehyde resin, a urea resin, phenol resin, epoxide resin, non-saturated polyester resin, diallyl phthalate or mixtures of the latter. The resin composition can be applied for example in an application quantity between ≥5 g/m² and ≤40 g/m², preferably ≥10 g/m² and ≤30 g/m². Furthermore, a paper or fleece with a weight in grams between ≥30 g/m² and ≤80 g/m², preferably between ≥40 g/m² and ≤70 g/m², can be applied on the plate-shaped carrier.

Moreover, provision can be made to apply decorations on the carrier by means of a partially or completely printed decorative film or decorative foil. A plastic film printed with a decoration and based on a thermoplastic, such as for example polyethylene terephthalate, polyethylene, polypropylene, polystyrene, or polyvinyl chloride, can for example be used as a decorative film or decorative foil. The thermoplastic resin is preferably one which has a good binding behaviour to the material of layer A, so that the decorative film can be thermally fixed or laminated on the carrier without the application of an adhesive layer.

Alternatively, provision can be made for a decorative foil or a decorative film to be applied on a carrier material according to the disclosure and fixed to the latter by means of a lacquer, in particular by means of a radiation-curable lacquer.

Furthermore, according to process step e), an application of a decorative layer, i.e. a decoration replicating a decorative pattern, can take place on at least a partial region of the carrier. The decoration can be applied by the so-called direct printing. The term "direct printing", in the sense of the disclosure, is understood to mean the application of a decoration directly onto the carrier of a panel or onto an unprinted fibre material layer applied on the carrier or a decorative undercoat. Use can be made of different printing techniques, such as for example flexo printing, offset printing or silk-screen printing. In particular, inkjet processes or laser printing processes can for example be used as digital printing techniques.

The decorative layers can also be formed from an, in particular, radiation-curable dye and/or ink. For example, a UV-curable dye or ink can be used.

The decorative layers can each be applied in a thickness in a range from ≥5 µm to ≤10 µm.

Furthermore, provision can also be made to apply, apart from a positive image in terms of colour and/or structure, also a corresponding negative image of the decorative pattern. In detail, as is known the example from a positive stain or negative stain for wood materials, the colour impression of a wood grain for example can be reversed by the use of digital data, so that a negative arises in respect of the colour or in particular brighter and darker areas. Apart from the colour impression, the corresponding effect is also possible for the applied structure, so that a negative can be produced also with regard to the structural formation. On the basis of the digital three-dimensional data, such effects can also be integrated into a production process without problem and without a lead time or modifications.

According to process step f), an application of a protective layer, in particular a wear protection layer, can be provided on at least a partial region of the decoration. Such a layer for the protection of the applied decoration can be applied in particular as a wear or cover layer above the decorative layer in a subsequent process step, which in particular protects the decorative layer against wear or damage due to dirt, influence of moisture or mechanical effects, such as abrasion. For example, provision can be made such that the wear and/or cover layer is applied as a pre-produced overlay layer, for example based on melamine, on the printed carrier and connected to the latter by a pressure and/or heat effect. It may also be preferable for a radiation-curable composition, such as for example a radiation curable lacquer, such as acrylic lacquer, to be applied in order to form the wear and/or cover layer. Provision can be made such that the wear layer comprises hard materials such as for example titanium nitride, titanium carbide, silicon nitride, silicon carbide, boron carbide, tungsten carbide, tantalum carbide, aluminium oxide (corundum), zirconium oxide or mixtures thereof, in order to increase the wear resistance of the layer. The application can take place for example by means of rollers, such as rubber rollers or by means of casting devices.

Furthermore, the cover layer can first be partially cured and then a final lacquering with a urethane acrylate and final curing, for example with a gallium radiator, are carried out.

Furthermore, the cover and/or wear layer can comprise means for reducing the static (electrostatic) charge of the final laminate. For example, provision can be made such that the cover and/or wear layer comprises compounds such as for example choline chloride. The antistatic agent can be contained for example in a concentration between ≥0.1 wt.-% and ≤40.0 wt.-%, preferably between ≥1.0 wt.-% and ≤30.0 wt.-% in the cover layer and/or the composition for the formation of the wear layer.

Furthermore, provision can be made such that a structuring, in particular a surface structuring corresponding to the decoration, can be introduced into the protective layer or wear or cover layer by introducing pores. Provision can be made such that the carrier plate already comprises a structuring and alignment of a printing tool for applying the decoration and the carrier plate with respect to one another takes place in dependence on the structuring of the carrier plate detected by means optical processes. For the alignment of the printing tool and the carrier plate with respect to one another, provision can be made such that a relative movement between the printing tool and the carrier plate required for the alignment with respect to one another takes place by means of a displacement of the carrier plate or by a displacement of the printing tool. Furthermore, provision can be made such that structuring of the decorative panels takes place after the application of the cover and/or wear layer. For this purpose, provision can preferably be made such that a curable composition is applied as a cover and/or wear layer and a curing process takes place only to the extent that only partial curing of the cover and/or wear layer takes place. A desired surface structure is embossed in the layer thus partially cured by means of suitable tools, such as for example a hard metal structuring roller or a stamp. The embossing takes place corresponding to the applied decoration. To ensure a sufficient correspondence of the structure to be introduced with the decoration, provision can be made such that the carrier plate and the embossing tool are aligned with one another by corresponding relative movements. Following the introduction of the desired structure into the partially-cured cover and/or wear layer, further curing of a now structured cover and/or wear layer takes place Provision can also be made such that structuring of the surface is produced by means of a method for producing a structure of a surface, wherein aliquid base layer is first applied on the surface of the workpiece and a multiplicity of droplets are then sprayed into the still liquid base layer in such a way that the layer thickness of the base layer changes at the points at which the droplets are sprayed. As a result of the spraying of the droplets into the previously applied liquid base layer, recesses are introduced into the latter. Fixing of the liquid base layer then takes place. This can take place thermally or by means of electromagnetic radiation depending on the base layer material.

According to an embodiment of the disclosure, provision can be made such that the wear protection layer is applied on the decorative layer in step f) as a liquid layer and cured on the latter to form the wear protection layer or is applied on the decorative layer as a pre-produced wear protection layer. A pre-produced wear protection layer can be formed for example by a film. The wear protection layer can comprise abrasion-inhibiting components. Such abrasion-inhibiting components can for example be hard materials such as corundum, individually or in combination with solids of lower hardness, such as for example cullet or glass spheres.

Moreover, a stabilising layer can be applied on the side lying opposite the decorative side.

According to an embodiment of the disclosure, the previously described tempering step can take place in particular after the previously described process step g) or h). In particular, provision can be made such that a decorated plate obtained after completion of step g) or h), comprising a plastic carrier material according to the disclosure, is first split up in the area, in order to obtain individual decorative panels, which then undergo profiling of at least two of the edges of the panels in order to form complementary locking means, by means of which panels can be connected to each other. A tempering step can then take place preferably only after the splitting-up and/or after the profiling of the panel.

The provision of a tempering step in the case of an already profiled panel represents a particularly preferred embodiment.

DRAWINGS

The drawings described herein are for illustrative purposes only of selected embodiments and not all possible implementations, and are not intended to limit the scope of the present disclosure.

The disclosure is further explained below with the aid of the figures and an example of embodiment.

Corresponding reference numerals indicate corresponding parts throughout the several views of the drawings.

DETAILED DESCRIPTION

Example embodiments will now be described more fully with reference to the accompanying drawings.

Figure 1:
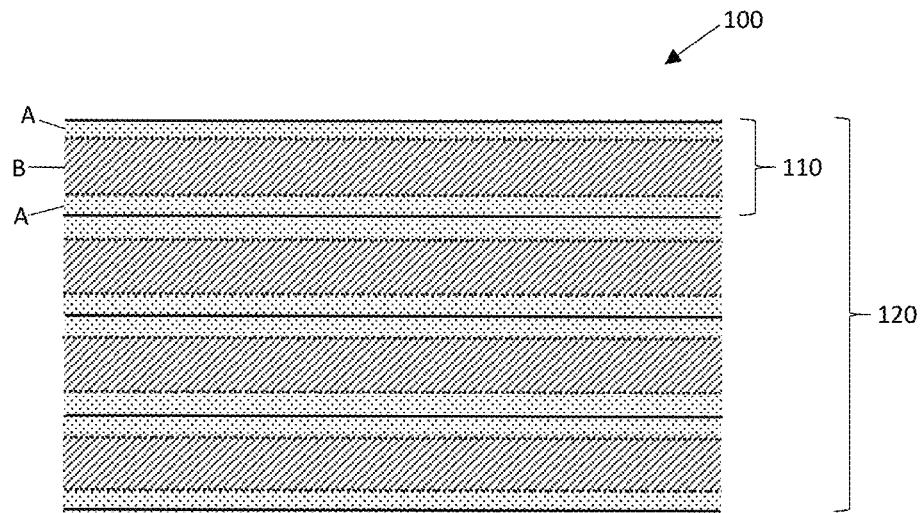
FIG. 1 shows a diagrammatic representation of an embodiment of a multi-laminate plastic carrier material provided in a decorative panel according to the disclosure.

FIG. 1 shows a diagrammatic representation of an embodiment of a multi-laminate plastic carrier material 100 according to the disclosure. Multi-laminate plastic material 100 comprises a plurality N of layer sequences A-B-A 110. In the diagrammatic embodiment shown, the number of layer sequences A-B-A amounts to 4 (N=4). Generally, the number of layer sequences A-B-A 110 lies between 3 and 250 (250≥N≥2). Layer A comprises a first thermoplastic resin and layer B comprises a second thermoplastic resin. The first thermoplastic resin is preferably a virginal plastic and the second plastic a recycled plastic. The thermoplastic resins are preferably polyethylene terephthalate. The latter are available in particular as recycled material in large quantities from the recycling of foodstuffs packaging. The thermoplastic resin of layer A is preferably a glycol-modified polyethylene terephthalate (PET-G). Surprisingly, it has been shown that glycol-modified PET can act as a sealing or adhesive layer between the A-B-A layer composites. Layer sequence A-B-A 110 can have in total a layer thickness between 100 μm and 2000 μm. Provision can be made such that the layer thickness of layer B amounts to between ≥100% and ≤3000% of the layer thickness of the layer A. In other words, layer B can have the same layer thickness as a layer A or can be up to 30 times as thick as the latter. In particular, provision can be made such that the predominant part of the total layer thickness of the layer composite A-B-A is provided by layer B. Thus, provision can for example be made such that the layer thickness of layer B provides 250% of the total layer thickness of layer composite A-B-A, preferably ≥60%, in particular ≥70% and still more particularly ≥90% of the total layer thickness. The thermoplastic resin of layer B can preferably be a plastic, in particular a PET, modified with fillers, such as for example talcum. Multi-laminate plastic carrier material 100 according to the disclosure can take place as a result of stacking film-like layer composites 110 upon one another to form a film stack 120, which is then pressed together under the effect of pressure and temperature. The pressure to be provided during the compression can, according to the disclosure, lie in a range from ≥0.5 MPa to ≤≥5 MPa, preferably in a range from ≥1 MPa to ≤15 MPa. The target temperature in the core of the film stack can preferably be adjusted in a range between ≥65° C. and ≤140° C., in particular in a range between ≥80° C. and ≤120° C. This provides for good binding between the individual triple-layer film-like layer composites 110. Preheating of triple-layer film-like layer composites 110 to for example ≥80 to ≤135° C. can be provided for the pressing process. Suitable heat sources for this can for example be a heated roller, hot air, an IR radiator, in particular an NIR radiator or a microwave radiator or a combination of the latter. The compression can take place for example in a double-band press, so that a continuous material is produced in a continuous process. Before the stacking of film-like composite layers 110 to form film stack 120, provision can be made such that the open surfaces of layer A are pretreated with a corona treatment. After the compression of film stack 120 to form the multi-laminate plastic carrier material according to the disclosure, the latter can be cooled and cut to a desired size.

Figure 2:
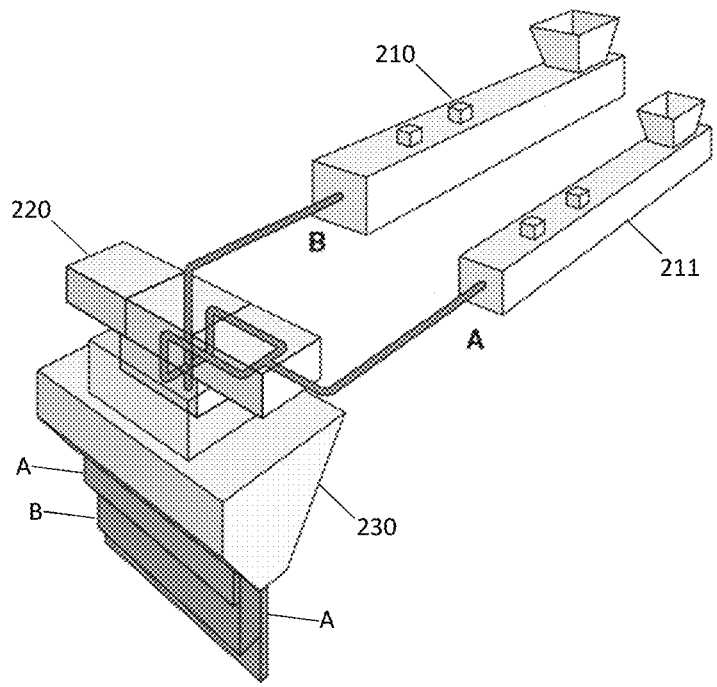
FIG. 2 illustrates the process sequence for the production of a film-like layer composite with film sequence A-B-A for a multi-laminate plastic carrier material provided in a decorative panel according to the disclosure and FIG. 3 shows a diagrammatic representation of the layer structure of an embodiment of a decorative panel according to the disclosure.

FIG. 2 illustrates the process sequence for producing a film-like layer composite with layer sequence A-B-A for a multi-laminate plastic carrier material according to the disclosure. According to the disclosure, provision can be made such that a film-like layer composite with layer sequence A-B-A is produced by coextrusion by means of a feed block 220 and a broad-slot die 230. Two co-rotating twin-screw extruders 210, 211 can for example be used. A main extruder 210 can be used for the material production of middle layer B and provision can be made such that the latter comprises two lateral feeds. These lateral feeds can serve for the mixing-in of fillers. Second twin-screw extruder 211 can be used for the production of the thermoplastic resin for the two layers of type A. The latter can also comprise lateral feeds in order to enable mixing-in of further components. In order to be able to remove any moisture and/or monomers that may be present from the polyester melt in the extruder, provision can be made to install a high-vacuum ventilation system in both twin-screw extruders.

The polymer melts from both extruders 210, 211 can be conveyed, separately from other, into a feed block 220. Whereas the melt from main extruder 210 forms the middle layer of type B, the material from coextruder 211 is conveyed above and below middle layer B and forms the outer layers of type A. The triple-layer melt can then be conveyed through a broad-slot die 230. By means of the latter, a uniform layer distribution over the entire desired film width is achieved. For the cooling process subsequently taking place, use can be made of different variants. The cooling of the melt can take place for example by means of a calendar roller system (calendar). A cooling roller can also be used. An air knife and a vacuum chamber can ensure that the melt lies uniformly against the cooling roller.

Figure 3:
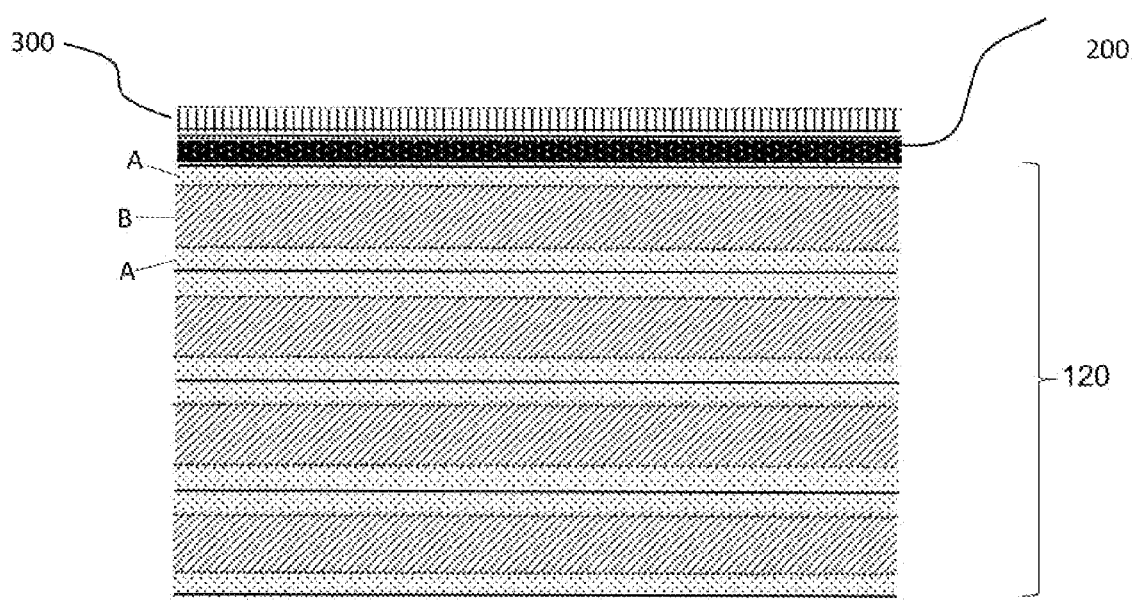

FIG. 3 shows a diagrammatic representation of the layer structure of an embodiment of a decorative panel according to the disclosure. The decorative panel comprises multi-laminate plastic carrier material. The multi-laminate plastic carrier material has a film stack 120 consisting of a multi-laminate layer structure with a plurality N of layer sequences of type A-B-A. Layer A comprises a first thermoplastic resin. Layer B comprises a second thermoplastic resin different from the thermoplastic resin of layer A. Layer B preferably comprises, apart from the thermoplastic resin, a filler. According to the disclosure, N lies between ≥3 and ≤≥50. A decorative layer 200 is arranged on carrier plate 100. Decorative layer 200 can preferably be applied by means of a direct printing process on carrier plate 100 with the optional prior application of a print material or primer. A wear protection layer 300 is arranged above decorative layer 200.

A decorative layer 200 is arranged on carrier plate 100. Decorative layer 200 can preferably be applied by means of a direct printing process on carrier plate 100 with the optional prior application of a print material or primer. A wear protection layer 300 is arranged above decorative layer 200.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

What is claimed is:

1. A carrier plate, for a decorative panel, the carrier plate comprising a multi-laminate layer structure with a plurality N of layer sequences of the A-B-A type, wherein layer A comprises a first thermoplastic resin and layer B a second thermoplastic resin different from the thermoplastic resin of layer A and wherein N lies between $\geq 3$ and $\leq \geq 50$, wherein layer B at least comprises a filler apart from the thermoplastic resin, wherein the filler is selected from the group comprising chalk, non-asbestos silicate, magnesium silicate, wood dust, expanded clay, volcanic ash, pumice, cellular concrete, inorganic foams, cellulose or a blowing agent and wherein the proportion of filler lies in a range between $\geq 1$ wt.-% and $\leq 60$ wt.-% related to the total mass of material forming layer B, wherein layer sequence A-B-A has in total a layer thickness between 100 μm and 2000 μm.

2. The carrier plate according to claim 1, wherein the thermoplastic resin of layer B comprises an amorphous thermoplastic resin.

3. The carrier plate according to claim 2, wherein the proportion of amorphous thermoplastic resin in layer B lies in a range between $\geq 10$ wt.-% and $\leq 100$ wt.-% related to the polymer proportion of layer B.

4. The carrier plate according to claim 1, wherein the thermoplastic resin of layer A comprises a glycol-modified polyethylene terephthalate (PET-G).

5. The carrier plate according to claim 4, wherein the proportion of glycol-modified polyethylene terephthalate lies in a range between $\geq 2$ wt.-% and $\leq 10$ wt.-% related to the thermoplastic resin of layer A.

6. The carrier plated according to claim 1, wherein the layer thickness of layer B amounts to between 100% and 3000% of the layer thickness of layer A.

* * * * *